United States Patent Office 2,703,168
Patented Mar. 1, 1955

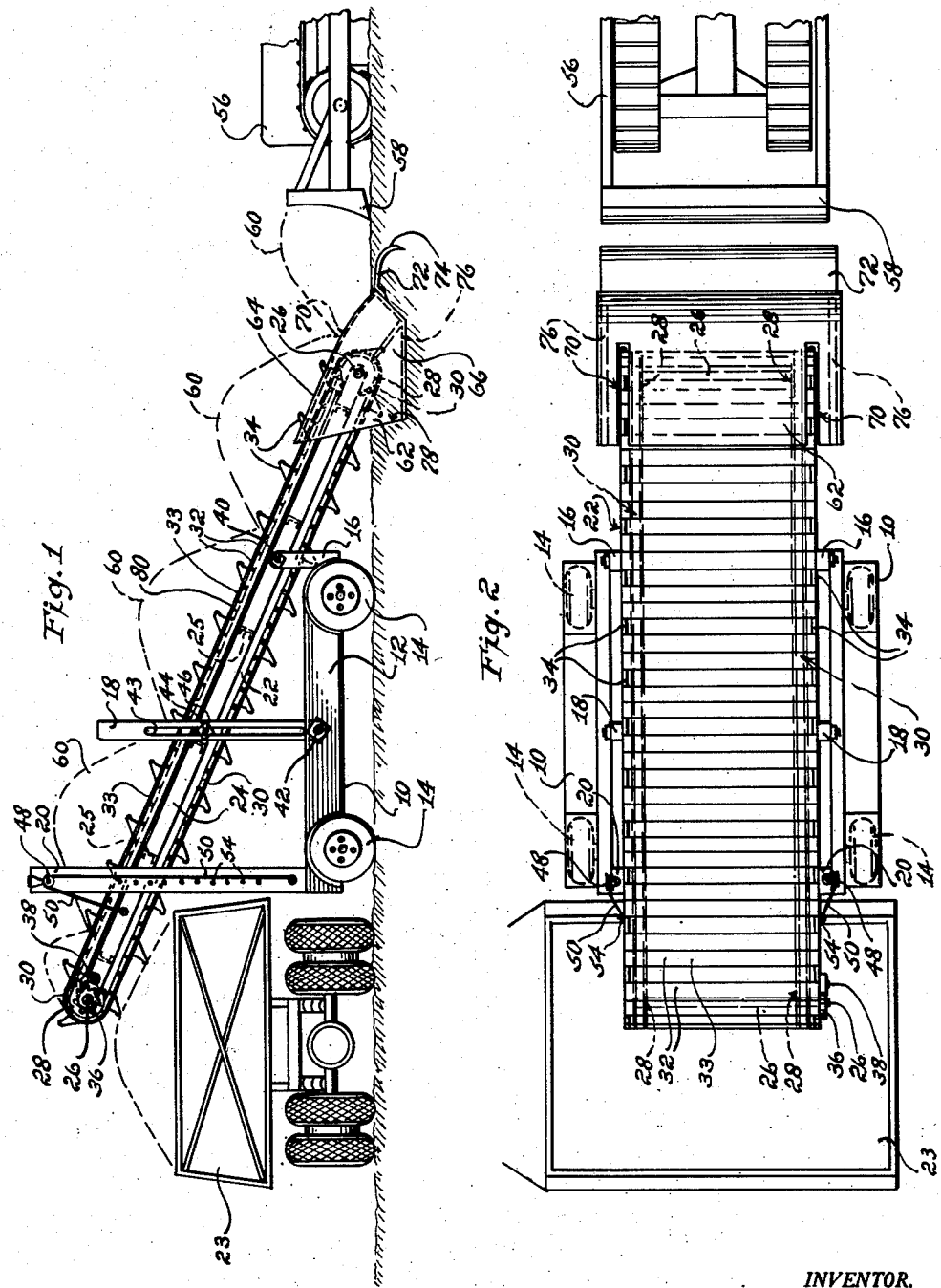

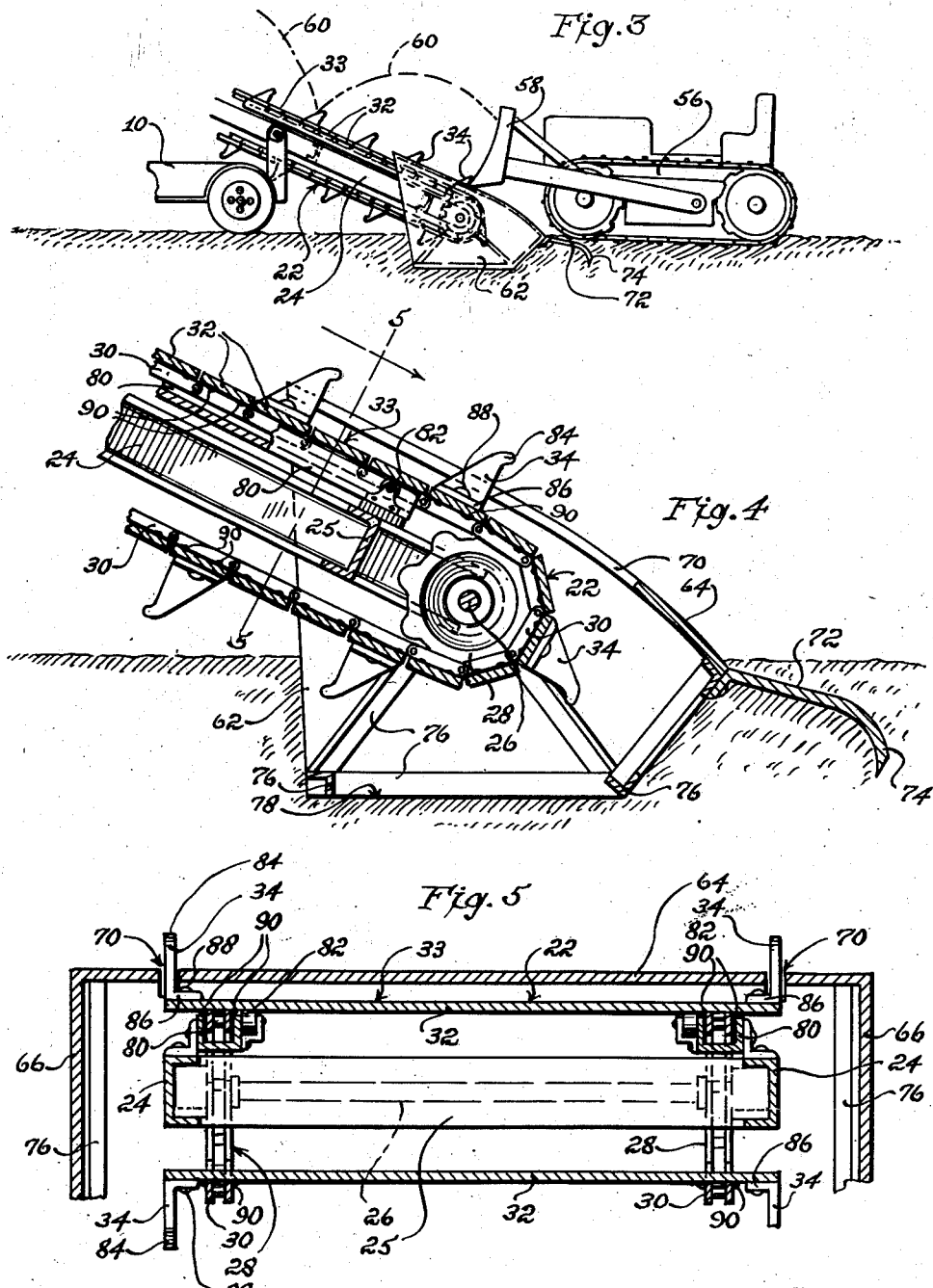

2,703,168

PORTABLE CONVEYER

Robert W. Barks, Columbus, N. J.

Application August 21, 1951, Serial No. 242,823

11 Claims. (Cl. 198—1)

This invention relates to portable conveyors of the type adapted for conveying dirt, gravel, coal or other loose material from the ground to an elevated level and there discharging it into a truck or other receptacle.

One of the objects of the present invention is to provide a portable conveyor unit of the type mentioned in which no inherent power for operation of the conveyor is required, but in which the conveyor is actuated intermittently by abutment of a scraper blade of a bulldozer, or the like, with abutment elements carried by an endless floor of the conveyor, during the operation of depositing the material on the conveyor floor.

Another object of the present invention is to provide a conveyor unit of the type mentioned having means for precluding backward movement of the conveyor floor when the bulldozer blade is withdrawn from contact with the conveyor abutments.

A further object of the invention is to provide a specially constructed ramp associated with the lower end of the conveyor upon which a bulldozer can push a load of material without the necessity of other means of supplying material to the conveyor.

A still further object of the present invention is to provide a portable conveyor and loader having an endless, flexible material carrying floor attached to an endless chain or belt, and having supporting elements therefor which afford free movement of the conveyor.

Other objects and advantages of my invention will be apparent from the following specification and reference to the accompanying drawings, in which:

Fig. 1 is a side elevation showing one embodiment of my improved conveyor and special ramp therefor;

Fig. 2 is a plan view of the conveyor shown in Fig. 1;

Fig. 3 is a partial view similar to Fig. 1 and showing a bulldozer blade in engagement with abutment elements on the conveyor platform;

Fig. 4 is a sectional view through the lower end of the conveyor; and

Fig. 5 is a section taken on the line 5—5 of Fig. 4.

Referring to the drawings in which like numerals designate like parts in the several views, my improved portable conveyor unit includes a truck 10 having side frame members 12 and wheels 14, by means of which the conveyor may conveniently be transported from one location to another. Upright standards 16, 18 and 20 are mounted on the side frame members 12, and the conveyor 22 is mounted between these standards in such a manner as to be adjustable to various rearwardly inclined positions to facilitate the movement of dirt, gravel, coal or other loose material from the ground to the necessary elevated position at the rear end of the conveyor and there discharged into a dump truck, or other carrier, to be hauled away.

The conveyor 22 consists of a pair of spaced, longitudinally disposed, side frame members 24, which are reinforced by cross bars 25, cross shafts 26 at each end, sprocket wheels 28 rigidly mounted on these shafts inwardly of the frame members 24, endless chains 30 carried by the wheels 28, and a plurality of slats 32 attached to the links of the chains 30 and forming an endless, flexible conveyor floor 33 for supporting the material to be moved. Outwardly projecting and longitudinally spaced fingers or abutment members 34 are carried in transversely opposed pairs by certain of the slats 32 at their outer ends, for a purpose to be explained later. On one of the shafts, and outwardly from the side frame 24, is mounted a ratchet wheel 36 which is engaged by a pawl 38 pivoted to the frame 24 to prevent backward rotation of the sprocket wheels 28 and the conveyor floor 33.

The side frames 24 are pivotally mounted at 40 on the standards 16 carried by truck 10 at a point much nearer the front than the rear end of the conveyor to permit a more extensive lift of the rear end of the conveyor. The standards 18 are intermediate of the standards 16 and 20. They are pivoted at 42 to the truck frame 10, and provided with elongated slots 43 through which bolts 44 carried by the frame members 24 slidably project. When the conveyor is adjusted to the desired position it is rigidly secured on such position by the nuts 46 on bolts 44. The standards 20 carry pulleys 48 over which cables 50 extend. One end of each cable 50 is attached to the side frame 24 and the other end is detachably connected to any one of a plurality of pins 54, according to the height of the rear end of the conveyor. These cables and the nuts 46 hold the frames 24 rigidly in any adjusted position. The pivoted connection of standard 18 permits it to swing back and forth as the incline of the conveyor is raised or lowered.

As already mentioned, the conveyor 22 is not provided with inherent means of actuating the conveyor floor 33. Instead, it is contemplated that the dirt or other material to be moved by the conveyor be placed thereon by a bulldozer 56, or a similar implement, having a scraper blade 58, and that as each charge of material 60 is pushed onto the lower, or front, end of the conveyor floor 33 the front edge of the blade will engage a pair of the abutment members 34 and impel the upper run of the conveyor floor rearwardly the distance traveled by the blade 58.

An independently movable ramp 62 having a top, or platform, portion 64 and side walls 66 is placed over the front end of the conveyor, so that the scraper 58 with its load of dirt or other material will be readily movable rearwardly on the ramp to a point where the material will be deposited on the conveyor and the ramp, as shown in Fig. 1. When the front edge of the blade 58 engages a transversely opposed pair of abutment members 34 the upper run of the conveyor floor 33 will be moved rearwardly until the blade 58 is withdrawn from contact with the abutments. During this movement the rearmost load of material will be carried over the rear end of the conveyor into the dump truck 23. The top portion 64 of the ramp 62 is provided with longitudinal slots 70 which permit passage therethrough of the abutment members 34, so that there will be no interference with the travel of the endless floor 33. The side walls 66 of the ramp 62 are intended to rest firmly upon the ground or other surface which may support the top 64 in a fixed position. An anchor member 72 may be attached to the front end of the ramp 62 as an aid in maintaining the ramp in a stationary position. The front end of the anchor member, which may consist of a plate of metal, has a downwardly turned front end portion 74, which is pressed firmly into the ground by the weight of the bulldozer, as shown in Fig. 3, thereby securely anchoring the ramp against longitudinal movement relative to the conveyor. The ramp may be reinforced by suitable means, such, for example, as the angle bars 76.

For the support of the upper run of the conveyor floor 33 when heavily loaded I may attach channel members 80 to the side frame members 24 to house the sprocket chains 30, and may also attach a plurality of longitudinally spaced rollers 82 to the inner edges of the channel members 80, with the rollers in position to support certain of the slats 32, as more clearly illustrated in Figs. 4 and 5.

The abutments 34 may be attached to the slats 32 in any suitable manner. In the form illustrated in the drawings, each abutment has a forwardly projecting hook 84 on its outer end and a foot 86 at its other end for attachment to the end of a slat 32 by means of rivets 88. It is desirable that the abutments be as thin as practicable to limit the necessary width of the slots 70 in the ramp top 64.

The slats 32 may be made of steel and attached to the links of the sprocket chain 30 by welding, as indicated at 90 in Fig. 5, or by other suitable means.

In the use of my improved conveyor it is moved on the truck 10 to a location where dirt or other material is to be moved, and a shallow excavation 78 made below the front end of the conveyor as a seat for the ramp 62. The conveyor is then adjusted to the desired degree of inclination with the lower side of the front end of the conveyor extending slightly below the ground level, and the ramp placed in such a position over the front end of the conveyor that the top portion 64 will be slightly above and in substantially parallel relation with the conveyor floor 33 of the conveyor and with the walls 66 resting firmly on the bottom of the excavation 78. The curved end of the anchor member 72 will also be pressed into the ground. In this position the abutment members 34 near the front end of the upper run of the conveyor will project freely through the slots 70 in the top portion of the ramp, and the rear end of the conveyor will be of sufficient height to accommodate the dump truck 23.

Dirt 60 is pushed onto the ramp 62 by the scraper blade 58 of the bulldozer 56, as indicated in dotted lines in Fig. 1. The dirt may be scraped directly from the ground and when a load is accumulated it is pushed onto the ramp and rearwardly until the blade 58 almost reaches the front end of the ramp. During the rearward movement of the blade 58 its front edge engages two of the transversely opposed abutment members 34 and moves the upper run of the conveyor floor 33 a corresponding distance, thereby causing the dirt on the rear end of the conveyor to be discharged into the dump truck 23. The same general procedure may be followed in surface mining of coal, or in moving gravel or other material from a pile of such material.

Various changes in the construction of my improved conveyor may be made by those skilled in the art within the spirit and scope of my invention. For example, other specific means than the abutment members 34 may be provided for cooperation with a bulldozer in actuating the endless conveyor floor 33; the ramp 62 may be so constructed as to fit inside the side frame members 24 and the abutment members 34, thereby dispensing with the slots 70 in the floor of the ramp; and the ramp 62 may be constructed with skeleton ground supports, instead of with the side walls 66. Therefore, it should be understood that the form of my invention shown and described is intended to be illustrative, only, and not restrictive to such specific construction.

I claim:

1. A portable conveyor unit comprising a truck having transversely spaced, upright supports, a frame pivotally mounted between said supports, conveyor supporting wheels journaled in each end of said frame, an endless flexible conveyor carried by said wheels, longitudinally spaced, outwardly projecting abutments carried by said conveyor, said abutments being adapted for engagement with the front edge of a scraper blade, whereby the upper run of said conveyor can be impelled rearwardly by said blade; and an independently movable ramp provided with a support therefor and adapted to cover the front end of said conveyor when the latter is inclined upwardly from the ground, said ramp having transversely spaced, longitudinal slots therein to permit passage therethrough of said abutments.

2. A portable conveyor unit comprising a truck having transversely spaced, upright supports, a frame pivotally mounted between said supports, conveyor supporting wheels journaled in each end of said frame, an endless flexible conveyor carried by said wheels, longitudinally spaced, outwardly projecting abutments carried by said conveyor, said abutments being adapted for engagement with the front end of a scraper blade, whereby the upper run of said conveyor can be impelled rearwardly by said blade, an independently movable ramp provided with a support therefor and adapted to cover the front end of said conveyor when the latter is inclined upwardly from the ground; and ratchet means carried by one end of said frame and cooperative with said conveyor to prevent backward movement of said conveyor.

3. A portable conveyor unit comprising a truck having transversely spaced, upright supports, a frame pivotally mounted between said supports, sprocket wheels journaled in each end of said frame inwardly of each side thereof, sprocket chains carried by said wheels, a conveyor consisting of a plurality of transversely disposed slats carried by said chains, longitudinally spaced, outwardly projecting abutments carried by certain of said slats, said abutments being adapted for engagement by the front edge of a scraper blade, whereby the upper run of said conveyor can be impelled rearwardly by said blade; and an independently movable ramp provided with a support therefor and adapted to cover the front end of said conveyor when the latter is inclined upwardly from the ground, said ramp having transversely spaced longitudinal slots therein to permit passage therethrough of said abutments.

4. In a portable conveyor unit of the class described, an endless conveyor provided thereon with longitudinally spaced, outwardly projecting abutments adapted to be engaged by a scraper blade, whereby the upper run of said conveyor may be impelled rearwardly by said blade, an independently movable ramp provided with a support therefor and adapted to cover the front end of said conveyor when the latter is inclined upwardly from the ground, said ramp having transversely spaced longitudinal slots therein to permit passage therethrough of said abutments; and means carried by said ramp for anchoring said ramp to a support.

5. In a portable conveyor unit of the class described, an endless conveyor provided thereon with means cooperable with a bulldozer whereby the upper run of said conveyor may be impelled rearwardly, an independently movable ramp adapted to cover the front end of said conveyor when the latter is inclined upwardly from the ground, means carried by said ramp for anchoring said ramp to a support; and ratchet means cooperative with one end of said conveyor for preventing backward movement of said conveyor.

6. In a portable conveyor unit of the class described, an endless conveyor provided thereon with longitudinally spaced, outwardly projecting abutments adapted to be engaged by a scraper blade, whereby the upper run of said conveyor may be impelled rearwardly by said blade, an independently movable ramp provided with a support therefor and adapted to cover the front end of said conveyor when the latter is inclined upwardly from the ground, and means carried by the front end of said ramp for anchoring said ramp to the ground.

7. In a portable conveyor unit of the class described, a ramp having an inclined top portion and side walls adapted to rest on the ground, said ramp having transversely spaced, longitudinal slots extending through its top portion and a downwardly curved portion on its front end adapted to be pressed into the ground to anchor said ramp thereto.

8. In a portable conveyor unit of the class described, an endless conveyor provided thereon with means cooperable with a bulldozer whereby the upper run of said conveyor may be impelled rearwardly, a ramp adapted to cover the front end of said conveyor when the latter is inclined upwardly from the ground, means carried by said ramp for anchoring said ramp to a support, and ratchet means cooperative with said conveyor for preventing backward movement of said conveyor.

9. A portable conveyor comprising a frame having an endless conveyor thereon, said frame being mounted on a movable support and tiltable thereon to locate one end of the conveyor near the ground, a ramp engageable with the ground when said frame is in said tilted position and arranged to extend over the lower end of the conveyor, means for advancing the upper run of the conveyor upward along said frame when in said tilted position including abutment members projecting above the ramp in position to be engaged by the blade of a scraper moving over said ramp, and means for preventing retrograde movement of the upper run of the conveyor under load.

10. A portable conveyor comprising a movable support, a frame mounted on said support and having an endless conveyor thereon, said frame being tiltable on said support to locate one end of the conveyor adjacent the ground, tracks extending lengthwise of the frame and rollers carried by said tracks to support the upper run of the conveyor and the load carried by said conveyor, a ramp connected to said frame and engageable with the ground when said frame is in said tilted position, said ramp being positioned to overlie the lower end of the conveyor when tilted, means for advancing the upper run of the conveyor including abutment means projecting upward above the ramp in position to be engaged by the blade of a scraper moving over the ramp, and ratchet means preventing retrograde movement of the upper run of the conveyor under load.

11. A portable conveyor of the character defined in claim 9 wherein the abutment members are carried by the conveyor.

References Cited in the file of this patent

UNITED STATES PATENTS

| 997,276 | Curtis | July 11, 1911 |
| 1,552,715 | Lutz | Sept. 8, 1925 |
| 1,895,626 | Johnson | Jan. 31, 1933 |
| 2,192,210 | Stout | Mar. 5, 1940 |
| 2,267,419 | Oster | Dec. 23, 1941 |